Oct. 8, 1957  F. H. MAGUIRE  2,808,728
MOTION CHANGING MECHANISM
Filed Sept. 5, 1956  2 Sheets-Sheet 1

Oct. 8, 1957     F. H. MAGUIRE     2,808,728

MOTION CHANGING MECHANISM

Filed Sept. 5, 1956     2 Sheets-Sheet 2

United States Patent Office 2,808,728
Patented Oct. 8, 1957

2,808,728

MOTION CHANGING MECHANISM

Felix Horace Maguire, Tullamore, New South Wales, Australia

Application September 5, 1956, Serial No. 612,908

4 Claims. (Cl. 74—25)

This invention relates to mechanisms for changing rotary motion to reciprocating motion and more particularly to such mechanisms adapted for the operation of windmill pumps, jack pumps or other devices.

The principal object of the invention is to provide a motion changing mechanism adapted to change rotary motion to reciprocating motion in which the period of rest at the end of each rectilineal reciprocating stroke is substantially eliminated.

Another object of the invention is to provide arcuate reciprocation of a driven member about a driving member of a mechanism changing rotary motion to reciprocating motion.

A further object of the invention is to provide a mechanism for changing rotary motion to reciprocating motion in which the cyclic velocity of the reciprocating stroke varies in conjunction with varying torque of the driven rotating member.

Accordingly, in a general and elemental form, this invention is for a motion changing mechanism comprising a rotatable driving member, a driven member in positive engagement with the driving member and rotatable on an eccentric axis, a link member joining the driving and the driven members central axes, a radius arm pivotally attached to the eccentric axis of the driven member and extending to a first pivotal anchorage, and an oscillating arm pivotaly mounted on the centre axis of the driven member and extending from each side thereof, one end of the said oscillating arm being adapted to slide in a second pivotal anchorage and having the other end adapted for transmitting motion rectilinearly.

In the foregoing statement of the invention in a general and elemental form, the components have been given a singular number but it will be readily understood that in the practice of the invention the components are not necessarily so restricted.

To provide a better understanding of the invention reference will be made to a preferred embodiment of this invention of a motion changing mechanism as applied to a reciprocating pump rod driven by a windmill.

The use of a windmill for such a purpose is well known and insofar as the present invention is concerned, conventional practice is followed in respect of the windmill tower, windwheel, pump and pump rod.

This preferred embodiment is illustrated in the accompanying drawings in which.

Figure 1:
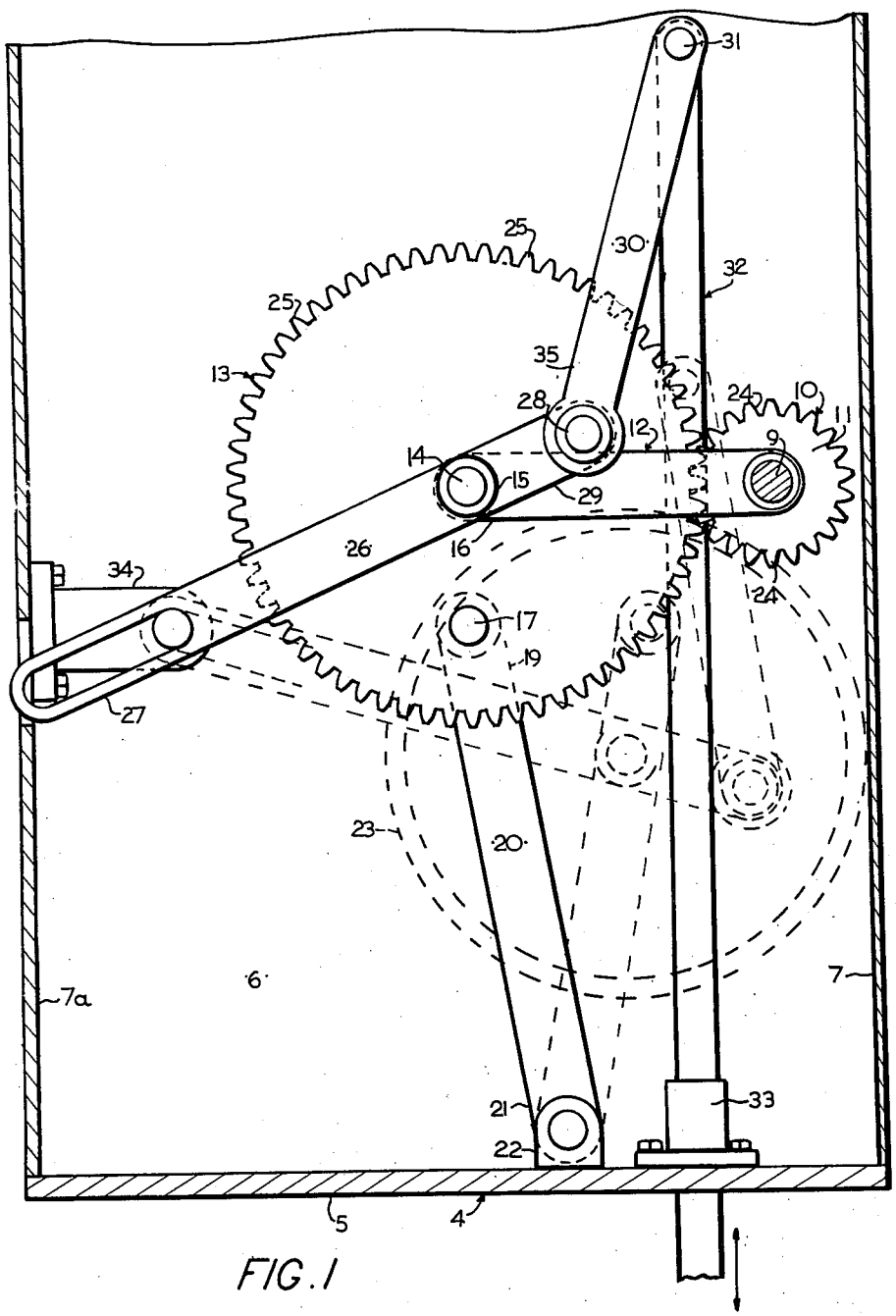
Figure 1 is a side elevation of the mechanism with a side of its housing removed to reveal the interior.
Figure 2:
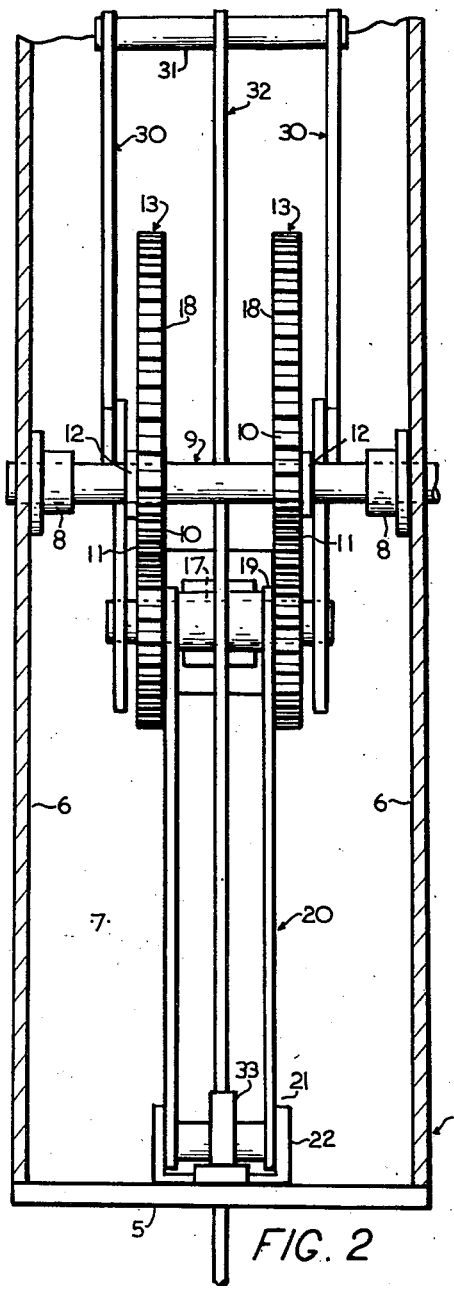
Figure 2 is an end elevation with an end of the housing removed to reveal the interior.
Figure 3:
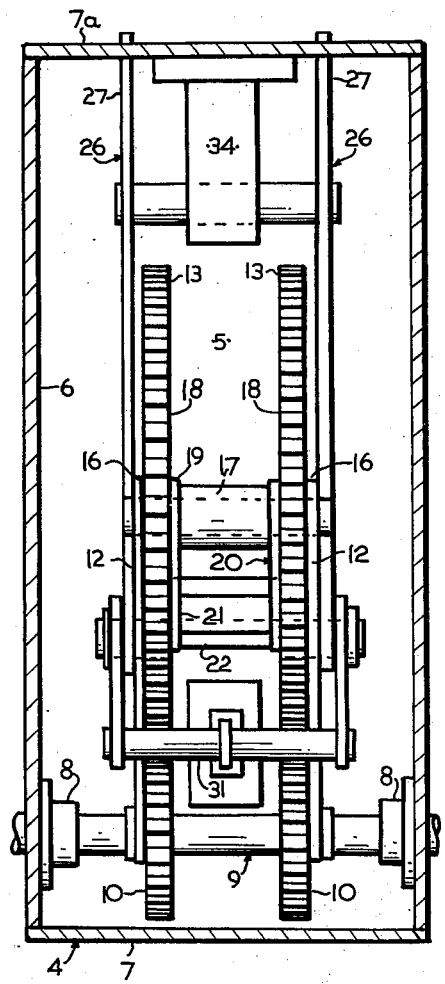
Figure 3 is a plan view with the top of the housing removed to reveal the interior.

Accordingly, there is provided a housing 4 comprising a base 5 from which side walls 6 and 7 extend upwardly to form an open box substantially rectangular in plan. In the long side walls 6, bearings 8 are incorporated for rotatably mounting the windwheel shaft 9 which will hereafter be termed the driving shaft. Within the housing 4 a pair of gear pinions 10 are affixed to the driving shaft 9 in spaced relationship. Adjacent to the outermost side faces 11 of the pinions 10 are link members 12 rotatably mounted on the shaft 9 to form a radial support for a pair of gear wheels 13 meshed with the pinions 10. Each of these gear wheels 13 has a stub shaft 14, see Figure 1, extending outwardly from its centre axis each stub shaft 14 being journalled in a bearing 15 provided adjacent to the free end 16 of each link 12.

The gear wheels 13 are connected together by a crank-pin 17 which is secured between their innermost faces 18 at a distance from their centre axes to provide an eccentric centre of rotation. One end 19 of a radius arm 20 is rotatably mounted on the crank-pin 17 and has its other end 21 pivotally secured to an anchorage 22 within the housing, and attached to the base 5 thereof.

In a typical assembly of the components so far described, let it be assumed that the base 5 of the housing 4 rests upon a level surface with its side walls 6 and 7 vertical and the driving shaft 9 horizontal. The pinions 10 and gear wheels 13 will be vertically co-planar, the link members 12 and radius arm 20 will be movable in a vertical plane, and the crank-pin 17 and stub axles 14 will be horizontal and parallel to the driving shaft 9. The pinions 10 and gear wheels 13 are meshed together with the axes of the driving shaft 9 and stub axles 14 in horizontal alignment, and the stub axles 14, crank-pin 17 and radius arm 20 anchorage in vertical alignment with the crank-pin 17 in a mediate position.

With the parts so disposed it may be seen that on rotation of the driving shaft 9, the affixed pinions 10 will cause the gear wheels 13 to rotate about their eccentric axis 17 which is rotatably supported by the pivotally anchored radius arm 20. The links 12 connecting the stub axles 14 on the centre axes of the gear wheels 13 to the driving shaft 9 maintain the pinions 10 and gear wheels 13 in mesh, and due to the eccentric rotation of the gear wheels 13 on the axis 17 journalled in one end 19 of the radius arm 20 the gear wheels 13 will oscillate about the pinions 11 in an arcuate manner. This motion imparts an up and down movement to the link members 12 which pivot about the driving shaft 9, and a to and fro movement to the radius arm 20 which pivots about its anchorage 22.

It may now be seen that the eccentricity of the gear wheels 13 in constant mesh with the pinions 10 will provide a high gear at the minimum radius of the eccentricity that is, when the gear wheels 13 are at the position shown by the dotted line 23 in Fig. 1, and a low gear at the maximum radius of the eccentricity, and when in motion, the gear ratio between the pinions 10 and the gear wheels 13 will correspondingly alternate with a corresponding change in the velocity of the driven gear wheels 13.

The arcuate oscillation of the gear wheels 13 about the pinion 10 also imparts an additional change in velocity to the gear wheels. For example, let it be assumed that when viewed from one end, the driving shaft 9 and pinions 10 are rotating at a constant velocity in a clockwise direction, at the right hand side of the gear wheels 13 which will then rotate in a contraclockwise direction. With the parts assembled as before described and starting from rest, the gear wheels 13 will move arcuately downward about the pinions 10 to position 23. Since the meshing gear teeth 24 of the pinions 10 are moving in an upward direction and the meshing gear teeth 25 of the gear wheels 13 are also moving in both an upward and a downward direction, the velocity of the gear wheels 13 will be increased. When the eccentric centre 17 of rotation of the gear wheels 13 passes its top dead centre, the gear wheels 13 will move arcuately about the pinions 10 in an upward direction. In this direction the enmeshed teeth 24 and 25 of the pinions 10 and the gear wheels 13 respectively are moving upwardly at the same velocity. Consequently, there is a rotational gain imparted to the gear wheels at each oscillation cycle.

When the mechanism is applied to driving a reciprocating pump this rotational gain will cumulatively give an additional working stroke to the pump for a given number of revolutions of the driving shaft.

To provide for this practice of the invention the mechanism as hereinbefore described is provided with a pair of arms 26 which are slidably and pivotally anchored at one end 27 to that longitudinal side wall 7a of the housing 4 remote from the driving shaft 9. These arms 26 extend to a position substantially medial between the driving shaft 9 and the eccentric axis 17 of the gear wheels when such axis is at its nearest approach to the said shaft 9, and are disposed adjacent to the furthermost side faces 11 of the gear wheels 13 and parallel thereto. The horizontal level of the arms 26 is such that they will intersect the centre axis stub shafts 14 of the gear wheels 13 when said shafts 14 are at the centre of their up and down stroke and the arms 26 are provided at this position with bearings 15 in which the respective stub shafts 14 are journalled. At their free ends 29 the arms 26 are provided with bearings 28 for the pivotal support of an inverted U-shaped connecting rod 30 which is disposed with its bridging member 31 uppermost. At the centre of the bridging member 31 a pivotal connection is provided for attachment of a pump rod 32 which passes through a vertical tube 33 secured in a hole in the base 5 of the housing 4.

It may now be seen that with the mechanism mounted on the turntable of a windmill tower and equipped with a windwheel, pump rod and pump in the conventional manner, the driving shaft when rotated by the windwheel will actuate the mechanism as before described. The arms 26 carrying the inverted U connecting rod 30 will be caused to pivot about their anchorage 34 by their co-operation with the gear wheel stub shafts 14 and will slide in the pivoted anchorage 34 to compensate for the arc traversed by the stub shafts 14. At their free ends 35 the pivotally mounted inverted U connecting rod 30 will reciprocate in an up and down direction and thus transmit a rectilinear motion to the connected pump rod 32 associated with the pump.

Notwithstanding a preferred embodiment and application of this invention having been described, it is to be understood that variations and modifications may be made thereto without departing from the principle thereof.

I claim:

1. A motion changing mechanism comprising a rotatable driving member, a driven member in positive engagement with the driving member and rotatable on an eccentric axis, a link member joining the driving and driven members central axes, a radius arm pivotally attached to the eccentric axis of the driven member and extending to a first pivotal anchorage, and an oscillating arm pivotally mounted on the centre axis of the driven member and extending from each side thereof, one end of the said oscillating arm being adapted to slide in a second pivotal anchorage and having the other end adapted for transmitting motion rectilinearly.

2. A motion changing mechanism as in claim 1 wherein a circumferential arc of the said driving member is traversed by the said driven member at each complete revolution of the driven member.

3. A motion changing mechanism as in claim 2 wherein the ratio of the lineal speeds of the driving member and the driven member at their place of engagement is unity during part of each revolution of the driving member.

4. A motion changing mechanism as in claim 3 wherein the speed ratio between the driving member and the driven member alternates between a high speed and a low speed ratio during any one revolution of the driven member.

No references cited.